United States Patent [19]

Pan et al.

[11] Patent Number: 5,077,181

[45] Date of Patent: Dec. 31, 1991

[54] OPTICAL RECORDING MATERIALS COMPRISING ANTIMONY-TIN ALLOYS INCLUDING A THIRD ELEMENT

[75] Inventors: Kee-Chuan Pan; Yuan-Sheng Tyan, both of Webster; Fridrich Vazan, Pittsford; Donald R. Preuss, Rochester, all of N.Y.

[73] Assignee: Eastman Kodak Company, Rochester, N.Y.

[21] Appl. No.: 519,335

[22] Filed: May 2, 1990

Related U.S. Application Data

[63] Continuation of Ser. No. 229,958, Aug. 9, 1988, abandoned.

[51] Int. Cl.$^5$ ............................ G03C 1/72; G11B 7/24
[52] U.S. Cl. ..................................... 430/495; 430/290; 430/346; 430/945; 346/135.1
[58] Field of Search ............... 430/495, 945, 346, 964, 430/17, 19, 290; 346/135.1

[56] References Cited

U.S. PATENT DOCUMENTS

| | | | |
|---|---|---|---|
| 4,230,939 | 10/1980 | de Bont et al. | 235/488 |
| 4,357,616 | 11/1982 | Terao et al. | 346/135.1 |
| 4,405,706 | 9/1983 | Takahashi et al. | 430/271 |
| 4,637,776 | 1/1987 | Terao et al. | 430/945 |
| 4,647,944 | 3/1987 | Gravesteijn et al. | 346/1.1 |
| 4,668,573 | 5/1987 | Terao et al. | 428/336 |
| 4,686,543 | 8/1987 | Tani et al. | 346/137 |
| 4,718,053 | 1/1988 | Sato et al. | 346/135.1 |
| 4,818,666 | 4/1989 | Gravesteijn et al. | 430/495 |

FOREIGN PATENT DOCUMENTS

| | | |
|---|---|---|
| 0184452 | 7/1986 | European Pat. Off. |
| 7394 | 7/1981 | Japan |
| 246788 | 3/1987 | Japan |
| 177446 | 9/1987 | Japan |

*Primary Examiner*—Richard L. Schilling
*Assistant Examiner*—Lee C. Wright
*Attorney, Agent, or Firm*—John R. Everett

[57] ABSTRACT

Antimony-tin alloys including a third element are useful for phase change optical recording. Some preferred alloys have a higher amorphous to crystalline transition temperature and thus, amorphous areas are stable for longer periods. Other preferred alloys exhibit improved CNR or lower noise or other improved performance characteristics.

7 Claims, No Drawings

OPTICAL RECORDING MATERIALS COMPRISING ANTIMONY-TIN ALLOYS INCLUDING A THIRD ELEMENT

This is a continuation of application Ser. No. 229,958, filed Aug. 9, 1988, now abandoned.

FIELD OF THE INVENTION

This invention relates to antimony-tin alloys that are useful in optical recording.

CROSS REFERENCE TO RELATED APPLICATIONS

The following commonly assigned, copending applications, each entitled RECORDING ELEMENT COMPRISING WRITE-ONCE THIN FILM ALLOY LAYERS, disclose and claim related inventions:

U.S. Ser. No. 014,336 filed Feb. 13, 1987 by Pan, Tyan and Preuss, now abandoned in favor of CIP U.S. Ser. No. 194,605 filed May 16, 1988; (antimony-tin and antimony-tin and indium);

U.S. Ser. No. 014,337 filed Feb. 13, 1987 by Pan, Tyan and Marino; and divisional U.S. Ser. No. 197,557 filed May 23, 1988; (antimony-tin and germanium);

U.S. Ser. No. 058,721 filed June 5, 1987 by Pan, Tyan and Vazan; (antimony-tin and aluminum);

U.S. Ser. No. 058,722 filed June 5, 1987 by Pan, Tyan and Preuss; (antimony-tin and zinc).

BACKGROUND OF THE INVENTION

Thin film optical recording layers using chalcogenide thin-films and amorphous to crystalline phase transitions have been the subject of many investigations since the early 1970's. The initial interests were focused on "erasable", and therefore reusable, optical recording layers since the amorphous to crystalline transition is, in principle, a reversible process. A low power, relatively long duration laser pulse is used to heat a local spot on the layer to below the melting point for a sufficient length of time to cause the spots to crystallize. These crystalline spots can in turn be heated, by a higher power, shorter duration laser, above the melting point of the crystallized spots to randomize the structure of the spots. The layer is designed such that upon the termination of the laser pulse, the cooling rate of the heated spot is high enough that the randomized structure is frozen to achieve an amorphous state.

Thus, by adjusting the laser power and duration, the state of a selected area on the layer can be switched between the amorphous state and the crystalline state to create a pattern of amorphous and crystalline spots which can be used for information storage. Since the phase transition is reversible, the pattern can be erased and replaced with a different recorded pattern. Theoretically, this erase-write cycle can be carried out any number of times.

Very few materials are known for optical recording layers in which the above described write-erase-write cycle is of practical use. No erasable phase-change type optical recording layers have been commercialized.

European Patent Application 0184452 discloses certain erasable optical recording layers of antimony-indium and antimony-indium-tin alloys. Information recording and erasure are said to be achieved by switching the layers between two different crystalline states. The layers are generally prepared in the amorphous state which has to be first converted into one of the two crystalline states before information can be recorded. The crystallized states, achieved by either a bulk heat-treatment or a prolonged laser exposure, are said to have a lower reflectance than the amorphous state. The examples indicate that the materials disclosed therein have a very slow rate of crystallization. This application further teaches that the optical recording layers disclosed therein are unsuitable for use in the amorphous-to-crystalline transition mechanism because of the instability of the amorphous state in general. Thus, because of the slow amorphous to crystalline transition and the instability of the amorphous state, the alloys disclosed in this reference are not suited to write-once recording.

A good deal of attention has also focused on so-called "write-once" thin film optical recording layers. Write-once simply means that the layers can be recorded upon only once. Such layers cannot be erased and reused for a subsequent recording.

Since thin film optical recording layers are generally amorphous when prepared, it is desirable to use the crystallization step as the recording step in write-once layers. However, the problem of slow crystallization prevents the achievement of high data rates with most known materials. High data rates are critical for write-once layers designed for use with computers.

Thus, a principal difficulty is that the rate of crystallization of most layers studied is usually too low. For practical applications, it is desirable to have layers which can be crystallized by laser pulses shorter than a microsecond ($\mu s$). Presently, few materials have demonstrated such capabilities. For some materials that do have high crystallization rates (e.g. Te-Sn alloy), the data retention times are often not adequate because of the instability of the amorphous state.

Thus, the problem was that the prior art had not provided write-once optical recording layers which possess the combination of a) a crystallization rate less than 1.0 $\mu s$, b) good corrosion resistance, c) a stable amorphous state and d) a capability of high rate, high density recordings.

This problem was solved in the first mentioned related application; copending U.S. Ser. No. 014,336 filed 2/13/87. In that application there is disclosed an alloy of antimony-tin and, in preferred embodiments, a third element indium, which alloy is capable of high performance write-once optical recording. The recording materials of that application do not suffer the environmental corrosion seen in chalcogen rich thin films typically used for write-once applications. The rate of crystallization of the antimony-tin optical recording layers is less than 1 $\mu s$ using practical laser power ($\leq 12$ mW). The dynamic recording sensitivity at 10 m/s is in the range of 3.5 to 6.5 mW. The amorphous state is very stable, particularly in those embodiments where the alloy includes indium. Thus, recordings on the thin film are made using the amorphous to crystalline transition mechanism. The layers are capable of high density, high rate recordings having a dynamic carrier-to-noise ratio (CNR) over 55 decibels, particularly in the range of 60 to 65 decibels.

The superior properties of these alloys are believed to be a result of the NaCl (or slightly distorted NaCl) type crystalline structure of the antimony-tin intermetallic phase. It is believed that this structure facilitates the fast transformation from the amorphous phase. While the binary antimony-tin alloy performs better than prior art materials, it still has a relatively low crystallization temperature and hence, is not suitable for applications where severe temperature conditions are to be expected. Further, the carrier-to-noise ratio is about 55 dB for the binary alloy. This is adequate for most applications but improvement is desirable for more demanding ones.

Indium can be used to stabilize the amorphous phase by increasing the amorphous to crystalline transition temperature. Indium was first selected since its atomic number (49) is similar to that of antimony (51) and tin (50). The use of indium also results in a significant improvement in the carrier-to-noise ratio of the recording process.

Subsequent to the discovery that indium could be used to improve the properties of the basic antimony-tin alloy, other basically antimony-tin alloys were discovered by the present assignee. Thus, applications were filed on antimony-tin alloys containing aluminum (U.S. Ser. No. 058,721 filed June 5, 1987); zinc (U.S. Ser. No. 058,722 filed June 6, 1987); and germanium (U.S. Ser. No. 014,337 filed Feb. 13, 1987).

In Japanese published patent application number J62-246,788, published Oct. 27, 1987 there is disclosed an antimony-tin-germanium alloy for optical recording. There is no suggestion in this publication that any other third element could be used with antimony-tin.

A number of other publications disclose a variety of alloys that are proposed for optical recording. However, none of these publications specifically disclose antimony-tin alloys of the present type, that is, alloys that have the advantageous combination of properties described above. Representative references are: U.S. Pat. Nos. 4,686,543 to Tani et al; 4,405,706 to Takahashi et al; 4,357,616 to Terao et al; 4,230,939 to deBont et al; 4,647,944 to Gravesteijn; and Japanese published applications numbers J60-177,446 and J58-7,394.

SUMMARY OF THE INVENTION

In accordance with the present invention, it has now been found that the element that is used in the antimony-tin recording alloy does not have to be indium, aluminum, zinc or germanium. Other elements can be used in the alloy to improve the amorphous to crystalline transition temperature, the carrier to noise ratio or other property of the recording layer. Thus, in accordance with the present invention there is provided a recording material comprising a write-once amorphous thin film optical recording layer of an alloy, said alloy comprising 1) antimony and tin in an amount and a proportion such that crystalline laser recorded marks of said alloy have a sodium chloride or a slightly distorted sodium chloride type crystal and 2) at least one other element, provided that said other element is not indium, aluminum, zinc or germanium.

In preferred embodiments, the additional element present in the alloy causes the amorphous to crystalline transition temperature to increase. The increase in the amorphous to crystalline transition temperature is important for the long term stability of the recording material. Recording layers having a higher transition temperature will be less prone to spontaneous amorphous to crystalline transition. It is estimated for example, (assuming 100 Kcal/mole activation energy, 50° C. storage temperature and that a 0.1% crystallization results in recording layer failure) that an alloy having a transition temperature of about 90° C. will have a storage lifetime of about 1 year. If the transition temperature is increased to about 110° C., the storage lifetime will be increased to about 1500 years.

Elements which have been found to increase the amorphous to crystalline transition temperature include, in addition to indium, aluminum, zinc and germanium, cadmium, nickel, iron, manganese, copper, oxygen, niobium and silicon. Thus, these are preferred elements for the antimony-tin alloys.

In other preferred embodiments, the recording materials of the invention will exhibit improved carrier-to-noise ratio when the recording material is used for optical recording. It appears that the additional element in the alloy makes the layer of the alloy smoother or makes the alloy harder so that there is less deformation when a laser is used to make the crystalline marks.

Elements which have been found to increase the carrier to noise ratio of recorded layers include, in addition to indium, chromium, bismuth, niobium and tungsten. Thus, these elements are also preferred in the present invention.

As with the antimony-tin (binary) and antimony-tin-indium alloys, the crystalline areas that are produced by laser recording are all in the same crystalline state and are thus distinguishable from the typical erasable recorded layers as illustrated by the materials described in European Patent Application 0184452 mentioned above.

Thus, in another aspect of the invention there is provided a recorded material comprising an amorphous thin film optical recording layer of an alloy having information recorded therein in the form of crystalline areas in said layer, the crystalline areas all being the same crystalline state, said alloy comprising 1) antimony and tin in an amount and a proportion such that said crystalline areas have a sodium chloride or a distorted sodium chloride type crystal and 2) at least one other element, provided that said other element is not indium, aluminum, zinc or germanium.

In still another aspect of the invention, there is provided a method of recording information, comprising the steps of:

a) providing a recording material comprising a write-once amorphous thin-film optical recording layer of an alloy, said alloy comprising 1) antimony and tin in an amount and a proportion such that crystalline laser recorded marks of said alloy have a sodium chloride or a distorted sodium chloride type crystal and 2) at least one other element, provided that said other element is not indium, aluminum, zinc or germanium, b) focusing an information modulated laser beam on said recording layer to form a pattern of crystalline and amorphous areas in the layer; wherein all of said crystalline areas are in the same crystalline state with a reflectivity that is different from the amorphous areas.

It was surprising that an alloy could be found for write-once application, that had a combination of a) a crystallization rate less than 1.0 $\mu$s, b) good corrosion resistance, c) a stable amorphous state and d) a capability of high rate, high density recordings, and retained this combination of properties even where an additional element was included in the alloy. The concern was that the additional element could disrupt the crystal structure of the crystalline phase and therefore reduce or eliminate the useful performance of the basic antimony-tin alloy. It was particularly surprising that in some cases, the performance was actually increased.

DETAILED DESCRIPTION OF THE INVENTION

As we have now found, the selection of the additional element that is added to the antimony-tin alloy is not critical. In addition to indium, aluminum, zinc and germanium which are the subject of the related applications mentioned above, cadmium, gallium, titanium, silicon, manganese, tellurium, niobium, iron, copper, tungsten, lead, molybdenum, sulfur, nickel, oxygen, selenium, thallium, arsenic, phosphorous, gold, palladium, platinum, hafnium and vanadium can be used. Mixtures of these elements are also useful.

The amount of the third element to be included in the alloy will depend on the element selected and the property to be improved. For example, the amount can range from the minimum amount that noticeably improves carrier-to-noise ratio when the alloy is used for recording up to the amount that the performance of the write-once antimony-tin properties are degraded, that is, up to the point where the element begins to interfere with the sodium chloride type crystal structure of the antimony-tin. In some cases, the carrier-to-noise ratio will be improved by as little as 0.6 atomic % of the third element. Somewhat higher concentrations, e.g. 3 to 35 atomic %, are useful to increase the amorphous to crystalline transition temperature by a more significant amount.

In the embodiments where the third element increases the transition temperature, it is preferred that the third element be present in an amount sufficient to increase the transition temperature by at least about 3° C. The third element is generally present in a minor amount, and preferably between 3 and 25 atomic percent. The optimum amount will vary depending on the element selected and can be determined by routine experimentation.

The amount of antimony and tin and their proportions are such that the crystalline phase of laser recorded marks comprises sodium chloride type crystals or crystals which have a slightly distorted sodium chloride type of crystal structure. This is a type of morphology that is well known in the art and can be determined by crystallizing a sample of the alloy in question and performing X-ray or electron beam diffraction analysis. If the X-ray pattern or electron difraction pattern is the same as or substantially the same as sodium chloride, it is considered to be a sodium chloride type of crystal structure. The antimony plus tin atomic percent is preferably at least 65%. The ratio of the atomic percent of the antimony to the atomic percent of the tin in the alloy is preferably between 1 and 9. Thus, the alloys useful in the invention can be represented by the formula:

$$Sb_xSn_yE_z$$

where E is the third element (or mixture of elements); x, y and z represent the atomic percent of the elements in the alloy and the ratio of x to y is between about 1 and 9 and z is between 0.6 and 35 atomic percent.

For the currently preferred third elements, the preferred alloys have the following compositions (the numbers following the element, represent the atomic percent in the alloys): Sb66Sn28Ga6, Sb58Sn32Ga10, Sb64Sn30Cd6, Sb52Sn39Cd9, Sb50Sn34Cd16, Sb68Sn8Te24, Sb61Sn26Cr13, Sb67Sn29Bi4, Sb63Sn27Nb10, Sb62Sn27Ti11, Sb62Sn27Si11, Sb59Sn32Ni9, Sb70Sn26Fe4, Sb66Sn25Mn9 and Sb61Sn28Cu11.

Optical recording layers can be prepared by conventional thin film deposition techniques such as RF (radio frequency) and DC (direct current) sputtering from an alloy target using the alloys of the invention. Enhancement of sputtering processes by applying magnetic fields (magnetron sputtering) can also be used. The thickness of the films can be from a few tens to a few hundreds of nanometers depending on compromises among factors such as contrast, sensitivity, production rate, material cost, ease of control, data rate, etc.

Supports which can be used include plastic plates, such as polyethylene terephthalate, polymethyl methacrylate, and polycarbonate, a glass plate, paper and metallic plates such as aluminum.

Recording information on the thin film layers made using the alloy of this invention is achieved by focusing an information modulated laser beam on the layer thereby forming a pattern of information on the layer in the form of crystallized areas in an otherwise amorphous layer.

A useful recording material comprises, starting from the outside surface of the recording material, an overcoat layer, a thin film optical recording layer and a substrate. In response to a drive signal, the intensity of a diode recording beam focused on the recording layer is modulated in accordance with information to be recorded.

During recording, the recording material is spun at a constant rate, e.g., 1800 rotations per minute (rpm). As a result, a track of information is recorded on the optical recording layer in the form of selected crystallized areas. As recording continues, the recording spot is caused to scan radially inward across the recording material, thereby causing information to be recorded along a spiral or concentric track. The sizes and spacings of the recorded information marks vary in accordance with the information content of the recording laser drive signal, as well as with radial position on the recording material.

During the readback process, the thus recorded information bearing recording material is spun at the same rate as it was spun during the recording process. The optical path of a readout laser beam is focused to a playback spot on the recording material by a high numerical aperture lens. The recording material is of the reflective type so that the radiation forming the playback spot is reflected back through the high numerical aperture lens after interacting with the information marks recorded on the optical recording material. A lens directs reflected laser radiation onto a detector which produces an electrical playback signal in response to temporal variations (contrast) in the irradiance of the reflected laser radiation falling on the detector.

Other types of recording materials are also useful. For example, a reflective substrate such as aluminum can be provided with a recording layer comprising an alloy of the invention on both sides of the substrate. A useful recording material is thus, aluminum coated on both sides with a smoothing layer, a layer of the phase change alloy of the invention and a layer of a clear protective overcoat. In a similar embodiment, the alloy is provided on a clear substrate which is then adhered to both sides of the substrate with an adhesive. In yet another embodiment, the alloy as described is provided on a transparent substrate to form the recording layer.

The optical recording layer is then adhered to the recording layer of an identical recording material with an adhesive layer. The thickness of the adhesive layer provides for the optical separation of the two recording layers.

In the examples presented below, the samples were tested for amorphous to crystalline transition temperature. The procedure was as follows. Deposited films to be tested were placed on a hot plate in a flowing nitrogen atmosphere. The films were initially amorphous. The temperature was raised at a rate of 10 milli Kelvin per second. During this heating, the specular reflectance of the surface of the layer is monitored until the entire layer has crystallized and the reflectance has passed a maximum. The data is analyzed and the amorphous to crystalline transition temperature is taken as the temperature at which the sample achieved one half of its total reflectance change.

Also in the examples below, alloys are tested for dynamic performance. A standard test format was used to measure the dynamic performance values. Specifically, coatings were deposited on clean glass substrates and tested on a dynamic test stand. The recording head used consisted of a 780 nm read diode laser and an 830 nm write diode laser utilizing a 0.55 numerical aperture lens. Read power was 0.5 mW with high frequency injection. Disks were tested at a radius of about 55 mm, a linear velocity of 10 m/s and a 2.78 MHz 50% duty cycle write frequency. Carrier to noise ratios were measured with an HP 3585A spectrum analyzer using a 30 KHz resolution bandwidth. Carrier level was measured at 2.78 MHz. Noise level was measured at 500 KHz above and below the carrier frequency and averaged. The optimum recording power (dynamic sensitivity) was the power at which a minimum intensity for the second harmonic of the carrier frequency was observed. The performance values presented below are obtainable on any research quality dynamic optical recording test facility that has a sufficiently low system noise level.

The following examples are presented to further illustrate the practice of the invention.

EXAMPLE 1

(a) Preparation of Optical Recording Medium

An alloy target comprising a mixture of Sb and Sn each in amount of 70% and 30% atomic, respectively, was co-sputtered with a third element; Cr, Nb, Bi, Ti, Si or W.

The sputtering system was pumped to below $1 \times 10^{-6}$ Torr before the chamber was back filled with 3 mTorr of Ar as the sputtering gas. An input power of 50 W was used for the 2 inch diameter $Sb_{0.7}Sn_{0.3}$ alloy target. The power and deposition time to the third element target were varied to achieve varying amounts of the third element in the deposited 70 nm thick film. The composition of each film was determined from the rate of deposition from the individual targets.

The films were deposited on glass microscope slides and 130 mm glass disk substrates. Next, the sputtering apparatus was returned back to normal pressure and film was spontaneously cooled to room temperature.

(b) Characterization of Optical Recording Medium

The glass disk substrate samples obtained in the above mentioned step (glass substrate) were dynamically evaluated for writing performance. Optimum recording power (ORP), carrier-to-noise ratio (CNR), carrier (CARR), written (WNOISE) and unwritten noise (UNIOSE), were determined at 10 m/s linear velocity and 2.78 MHz recording frequency at 50% duty cycle, to obtain a mark length of 1.8 μm. Recording and reading were performed through the glass substrate.

Reflectivity (RFLv) of the amorphous film at 830 nm was measured with a spectrophotometer from the film side. If the reflectivity of the layer is too low, e.g. below 15%, tracking will be a problem. If too high, e.g. above 70%, the contrast (DLT R) of the written areas could be too low.

The change in reflectivity (DLT R) between amorphous and crystalline phase of about 1 μm size mark was measured (also from the film side) with 830 nm diode laser and a microscope. The DLT R or contrast is important in providing good carrier signal.

(c) Conclusions

The data for the samples are presented below in Table 1. In each instance, the performance of the antimony-tin alloy was improved by the addition of a third element. In some instances, the amorphous to crystalline transition temperature is improved. In other instances, the CNR is improved.

Cr

Improvement in dynamic recording is achieved by addition of Cr to $Sb_{70}Sn_{30}$ alloy film. Up to 17.4 atomic % of Cr was added with continuous improvement in CNR, written and unwritten noise, indicating that higher concentrations of Cr may produce further improvements.

Bi

Addition of Bi at low concentrations, between 0.7 to 4.7 atomic %, produced improvement in CNR, written and unwritten noise. At concentrations higher than 5.0 atomic % the sputtered film was crystalline.

Nb

Addition of Nb, from 0.6 to 15.6 atomic % continuously improves CNR, written and unwritten noise. Nb at concentrations of 9.8 atomic % or higher, also increases the transition temperature of amorphous phase, improving the thermal stability.

Ti

Ti at concentration of 2.3 atomic % or lower did not produce any improvement in writing performance. Concentrations of 3.9 to 6.1 atomic % produced crystalline film. Concentrations of 8.6 atomic % or higher improved CNR.

Si

Addition of Si at 6.2 atomic % or higher increased the transition temperature of the amorphous phase, improving the thermal stability of the film.

W

Improvement in written noise and CNR is achieved by addition of tungsten of up to 13.14 atomic %. A tungsten concentration of 9.46 atomic % or higher, also increases the transition temperature of the amorphous phase, improving the thermal stability.

Pb

Addition of Pb to $Sb_{70}Sn_{30}$ at low concentrations (from 1.05 to 7.48 atomic %) increases the transition temperature of the amorphous phase up to 135° C., improving thermal stability of the film. Compositions with Pb concentration higher than 7.48 atomic % produce crystalline films as made. Dynamic performance is also improved by addition of lead. Lower writing noise produces higher signal to noise ratio, while sensitivity and carrier intensity is essentially unchanged, relatively to the control.

Hf

At hafnium concentrations from 1.29 atomic % to 8.67 atomic %, increases the transition temperature of the amorphous phase, improving the thermal stability of the film. Dynamic performance is also improved by addition of hafnium up to 8.67 atomic %. Lower writing noise produces better signal to noise ratio. At concentrations of hafnium above 8.67 atomic %, the film becomes too insensitive and contrast (change in reflectance between amorphous and crystalline phase) is reduced.

EXAMPLE 2

In separate series of examples, samples were prepared in a similar manner except that the alloys were sputtered from a mixed powder target instead of cosputtering from two targets. These samples were tested for transition temperature as described previously and were tested for writing sensitivity and contrast on a static pit tester. The static pit tester provides automated facilities in which a microcomputer controls the sample position, the laser power and the laser pulse width. Each recording layer is exposed with a 790 nm laser diode in the static pit tester to produce a matrix of spots in which the laser power is varied from 0.7 to 12 mW and the pulse

TABLE I $(Sb_{70}Sn_{30})_{100-x}E_x$

| E x atomic % | DYNAMIC PERFORMANCE @ 10 m/s | | | | | DLT R 12/100 | RFLv 830 nm | T.TMP °C. |
|---|---|---|---|---|---|---|---|---|
| | ORP | CNR | CARR | WNOISE | UNOISE | | | |
| 0.0 | 4.12 | 50.75 | −9.5 | −60.25 | −70.25 | 20.5 | 56.7 | 100 |
| Cr | | | | | | | | |
| 0.9 | 4.58 | 54.50 | −8.8 | −63.30 | −67.55 | 18.0 | 56.0 | 72 |
| 4.0 | 5.09 | 56.20 | −8.9 | −65.10 | −68.30 | 18.5 | 56.5 | 74 |
| 8.3 | 6.18 | 57.40 | −9.8 | −67.20 | −69.65 | 18.9 | 56.7 | 78 |
| 13.0 | 7.57 | 56.80 | −12.0 | −68.80 | −71.10 | 14.6 | 57.3 | 82 |
| 17.4 | 9.75 | 57.40 | −14.4 | −71.50 | −72.20 | 10.8 | 57.6 | 91 |
| Bi | | | | | | | | |
| 0.7 | 4.43 | 56.50 | −9.2 | −65.70 | −75.15 | 20.7 | 54.2 | 103 |
| 4.7 | 4.46 | 56.60 | −9.3 | −65.90 | −75.20 | 20.8 | 54.1 | 93 |
| 6.0 | — | | CRYSTALLINE | | | FILM | | — |
| Nb | | | | | | | | |
| 0.6 | 4.39 | 54.35 | −8.9 | −63.25 | −71.50 | 18.5 | 54.0 | 81 |
| 1.3 | 4.48 | 55.90 | −8.8 | −64.70 | −68.20 | 16.8 | 54.3 | 77 |
| 2.7 | 5.37 | 57.80 | −9.4 | −67.20 | −75.05 | 12.2 | 55.1 | 77 |
| 5.4 | 7.12 | 60.40 | −12.3 | −72.70 | −74.80 | 11.7 | 57.7 | 88 |
| 9.8 | 10.67 | 59.75 | −14.2 | −73.95 | −74.50 | 2.9 | 58.3 | 113 |
| 15.6 | 13.45 | 58.25 | −15.4 | −73.65 | −74.50 | — | — | 153 |
| Ti | | | | | | | | |
| 1.1 | 4.25 | 48.35 | −8.8 | −57.15 | −57.45 | 21.0 | 58.0 | 60 |
| 2.3 | 4.40 | 41.60 | −9.1 | −50.70 | −47.80 | 19.6 | 60.1 | 55 |
| 3.9 | — | | CRYSTALLINE | | | FILM | | — |
| 6.1 | — | | CRYSTALLINE | | | FILM | | — |
| 8.6 | 6.68 | 52.65 | −13.1 | −65.75 | −66.60 | 11.9 | 64.3 | 61 |
| 11.5 | 8.62 | 53.40 | −15.1 | −68.50 | −68.75 | 11.9 | 62.6 | 81 |
| Si | | | | | | | | |
| 1.0 | 4.16 | 44.15 | −9.2 | −53.35 | −57.20 | 17.8 | 64.3 | 63 |
| 1.7 | 4.16 | 43.65 | −8.9 | −52.55 | −55.75 | 19.4 | 62.3 | 72 |
| 2.7 | 4.13 | 45.80 | −8.8 | −54.60 | −57.55 | 22.2 | 61.7 | 77 |
| 4.3 | 4.21 | 48.35 | −8.8 | −57.15 | −59.65 | 24.3 | 62.2 | 88 |
| 6.2 | 4.49 | 48.40 | −8.9 | −57.30 | −59.70 | 23.2 | 60.5 | 104 |
| 8.5 | 4.80 | 47.75 | −8.9 | −56.65 | −59.15 | 23.9 | 57.8 | 112 |
| 11.1 | 5.88 | 47.90 | −13.1 | −61.00 | −63.50 | 21.5 | 54.9 | 132 |
| W | | | | | | | | |
| 1.09 | 4.34 | 52.10 | −9.4 | −61.50 | −73.00 | 21.7 | 56.3 | 90 |
| 3.33 | 4.88 | 58.10 | −9.5 | −67.60 | −73.00 | 21.1 | 56.4 | 91 |
| 6.16 | 6.61 | 61.00 | −11.2 | −72.20 | −73.50 | 17.9 | 57.8 | 104 |
| 9.46 | 11.22 | 60.90 | −12.2 | −73.10 | −74.00 | 12.1 | 58.8 | 135 |
| 13.14 | 13.23 | 59.20 | −13.6 | −72.80 | −74.00 | 6.6 | 58.4 | 174 |
| 17.24 | 13.94 | 50.80 | −15.5 | −66.30 | −69.00 | 6.9 | 58.1 | 183 |
| Pb | | | | | | | | |
| 1.05 | 4.64 | 56.30 | −9.5 | −65.80 | −73.90 | 15.7 | 61.2 | 134 |
| 7.48 | 4.97 | 58.20 | −9.4 | −67.60 | −72.90 | 18.2 | 59.9 | 135 |
| 19.27 | — | | CRYSTALLINE | | | FILM | | — |
| 31.94 | — | | CRYSTALLINE | | | FILM | | — |
| Hf | | | | | | | | |
| 0.02 | 4.46 | 49.90 | −9.3 | −59.20 | −70.55 | 16.5 | 62.7 | 72 |
| 0.05 | 4.47 | 49.70 | −9.6 | −59.30 | −70.55 | 18.2 | 61.8 | 73 |
| 1.29 | 4.53 | 54.00 | −9.1 | −63.10 | −71.40 | 16.9 | 62.4 | 82 |
| 4.39 | 6.03 | 58.90 | −10.3 | −69.20 | −72.60 | 17.2 | 63.1 | 98 |
| 8.67 | 8.95 | 57.30 | −14.1 | −71.40 | −72.65 | 11.4 | 64.0 | 128 |
| 12.73 | — | LOW CONTRAST AND SENSITIVITY | | | — | 8.1 | 63.7 | 150 |
| 14.83 | — | LOW CONTRAST AND SENSITIVITY | | | — | 4.7 | 63.9 | 150 |

DLT R = Change in reflectance with exposure to 12 mW and 100 ns laser pulse, measured with static pit tester on the film surface.
RFLv = Reflectivity of the unrecorded amorphous film at 830 nm, measured with BECKMAN MODEL DK−A Spectrophotometer, film surface.
T.TMP = Transition temperature, (amorphous film to crystalline).

width varied from 50 to 30,000 nanoseconds. The suitability of the recording layer for optical recording is determined by measuring the change in reflection between the exposed and the unexposed areas of the sample, i.e. between the crystalline and the amorphous states.

In the table, the laser power needed to write at a 50 nanosecond pulse width is a measure of the sensitivity of the film. A lower power indicates a higher sensitivity.

In addition, the ratio of antimony to tin was varied. The results are shown in Table 2.

TABLE II

Sb$_x$ Sn$_y$ + E$_z$ Alloy for Write-Once Optical Recording

| E | Composition | Transition Temp. (°C.) | Power needed to write at 50 ns. (mW) | ΔR at 100 ns 12 mW (%) |
|---|---|---|---|---|
| Control | Sb70Sn30 | 100 | 4 | 14 |
| Ga | Sb75Sn22Ga3 | 130 | 3 | 12 |
| Ga | Sb66Sn28Ga6 | 158 | 4 | 15 |
| Ga | Sb58Sn32Ga10 | 161 | 4 | 15 |
| Ga | Sb60Sn22Ga18 | 210 | 5 | 8 |
| Cd | Sb53Sn43Cd4 | 122 | 2.5 | 22 |
| Cd | Sb64Sn30Cd6 | 150 | 2.5 | 23 |
| Cd | Sb77Sn17Cd6 | 167 | 3 | 21 |
| Cd | Sb52Sn39Cd9 | 140 | 2.5 | 21 |
| Cd | Sb73Sn15Cd12 | 177 | 3 | 22 |
| Cd | Sb44Sn44Cd12 | 125 | 2.5 | 17 |
| Cd | Sb50Sn34Cd16 | 155 | 3 | 15 |
| Cd | Sb62Sn21Cd17 | 188 | 4 | 17 |
| Te | Sb68Sn8Te24 | 125 | 10 | 13 |
| Ni | Sb59Sn32Ni9 | 109 | 12 | 7 |
| Fe | Sb70Sn26Fe4 | 110 | 5 | 15 |
| Mn | Sb66Sn25Mn9 | 136 | 4 | 15 |
| Cu | Sb61Sn28Cu11 | 123 | 4 | 13 |
| O* | Sb86Sn14O$_z$ | 150 | 2.5 | 12 |
| O | Sb82Sn18O$_z$ | 160 | 3 | 11 |
| O | Sb77Sn23O$_z$ | 170 | 2.5 | 12 |
| O | Sb68Sn32O$_z$ | 130 | 3 | 13 |

*Films were prepared by reactive sputtering. 1.3% of O$_2$ in Ar was used during sputtering. Total pressure was 8 mtorr. Flow rate was 23 cpm.

The invention has been described in detail with particular reference to preferred embodiments thereof, but it will be understood that variations and modifications can be effected within the spirit and scope of the invention.

We claim:

1. A recording material comprising a write-once amorphous thin film optical recording layer of an alloy, consisting essentially of 1) antimony and tin in an amount and a proportion such that crystalline laser recorded marks of said alloy have sodium chloride or a distorted sodium chloride type crystal and 2) an additional element selected from the groups consisting of cadmium, titanium, silicon, manganese, tellurium, niobium, iron, copper, tungsten, molybdenum, nickel, thallium, arsenic, phosphorous, gold, chromium, palladium, platinum, hafnium, vanadium and mixtures of said elements.

2. A recording material according to claim 1 wherein said other element is present in an amount sufficient to increase the amorphous to crystalline transition temperature by at least about 3° C.

3. A recording material according to claim 2 wherein said other element is present in an amount between 3 and 35 atomic percent.

4. A recording material according to claim 1 wherein said other element is selected from the group consisting of chromium, bismuth, niobium and tungsten and is present in an amount sufficient to improve the carrier to noise ratio when said material is used for optical recording.

5. A recording material according to claim 1 wherein said other element is selected from the group consisting of cadmium, nickel, iron, manganese, copper, niobium, tellurium and silicon, and is present in an amount sufficient to increase the amorphous to crystalline transition temperature of said alloy.

6. A recording material comprising a write-once amorphous thin film optical recording layer of an alloy represented by the formula:

$$Sb_xSn_yE_z$$

where E is is selected from the group consisting of cadmium, titanium, silicon, manganese, chromium, tellurium, niobium, iron, copper, tungsten, molybdenum, nickel, thallium, arsenic, phosphorous, gold, palladium, platinum, hafnium and vanadium; x, y and z represent the atomic percent of the elements in the alloy and the ratio of x to y is between about 1 and 9, such that crystalline laser recorded marks of said alloy have a sodium chloride or a distorted sodium chloride type crystal, and z is between 0.6 and 35 atomic percent.

7. A recording material according to claim 6 wherein said alloy is an alloy selected from the group consisting of Sb64Sn30Cd6, Sb52Sn39Cd9, Sb50Sn34Cd16, Sb68Sn8, Te24, Sb61Sn26Cr13, Sb67Sn29Bi4, Sb63Sn27Nb10, Sb62Sn27Ti11, Sb62Sn27Si11, Sb59Sn32Ni9, Sb70Sn26Fe4, Sb66Sn25Mn9 and Sb61Sn28Cu11.

* * * * *